(12) United States Patent
Steinkogler

(10) Patent No.: US 10,377,447 B2
(45) Date of Patent: Aug. 13, 2019

(54) SAILBOAT

(71) Applicant: Peter Steinkogler, Ebensee (AT)

(72) Inventor: Peter Steinkogler, Ebensee (AT)

(*) Notice: Subject to any disclaimer, the term of this patent is extended or adjusted under 35 U.S.C. 154(b) by 0 days.

(21) Appl. No.: 15/544,506

(22) PCT Filed: Jan. 18, 2016

(86) PCT No.: PCT/AT2016/050007
§ 371 (c)(1),
(2) Date: Sep. 7, 2017

(87) PCT Pub. No.: WO2016/115583
PCT Pub. Date: Jul. 28, 2016

(65) Prior Publication Data
US 2018/0015987 A1 Jan. 18, 2018

(30) Foreign Application Priority Data
Jan. 19, 2015 (AT) .............................. A 50029/2015

(51) Int. Cl.
B63B 1/24 (2006.01)
B63B 1/32 (2006.01)
(Continued)

(52) U.S. Cl.
CPC ................. B63B 1/24 (2013.01); B63B 1/26 (2013.01); B63B 1/322 (2013.01); B63B 13/00 (2013.01);
(Continued)

(58) Field of Classification Search
CPC .. B63B 1/24; B63B 1/26; B63B 1/322; B63B 43/04
See application file for complete search history.

(56) References Cited

U.S. PATENT DOCUMENTS 2,646,235 A * 7/1953 Dawson, Sr. ........... B64C 35/00
114/283
3,949,695 A * 4/1976 Pless ........................ B63B 1/28
114/274
(Continued)

FOREIGN PATENT DOCUMENTS

EP 0 084 995 A1 8/1983
EP 0 358 888 A1 3/1990
(Continued)

OTHER PUBLICATIONS

Espacenet. English language abstract of FR 2 655 309 A1. Christophe Barbier Preville, Jun. 7, 1991.

Primary Examiner — S. Joseph Morano
Assistant Examiner — Jovon E Hayes
(74) Attorney, Agent, or Firm — Tiajoloff & Kelly LLP

(57) ABSTRACT

A sailboat is described having a boat hull (1), two flow profiles (2, 3) protruding laterally from the boat hull (1), and at least one underwater hydrofoil (16). To be able to achieve high travel velocities while maintaining the stability of the sailboat and balanced control behavior, it is proposed that the flow profiles (2, 3) protrude outward in a V shape from the boat hull and each have an aerodynamic stabilizer forming an aerodynamic aileron (4, 5), and/or the at least one underwater hydrofoil (16) is provided with a hydrodynamic stabilizer forming a hydrodynamic aileron.

16 Claims, 3 Drawing Sheets

(51) Int. Cl.
*B63B 13/00* (2006.01)
*B63B 43/06* (2006.01)
*B63H 9/04* (2006.01)
*B63B 1/26* (2006.01)
*B63B 43/04* (2006.01)

(52) U.S. Cl.
CPC .............. *B63B 43/04* (2013.01); *B63B 43/06* (2013.01); *B63H 9/04* (2013.01); *B63B 2043/042* (2013.01); *Y02T 70/12* (2013.01)

(56) References Cited

U.S. PATENT DOCUMENTS

| | | | | | |
|---|---|---|---|---|---|
| 3,966,143 | A | * | 6/1976 | Smith | B64C 31/02 244/16 |
| 3,987,982 | A | * | 10/1976 | Amick | B64C 31/02 114/272 |
| 4,080,922 | A | * | 3/1978 | Brubaker | B63B 1/30 114/282 |
| 4,164,909 | A | * | 8/1979 | Ballard | B63H 9/0607 114/102.29 |
| 4,592,298 | A | * | 6/1986 | Finot | B63H 9/0607 114/126 |
| 4,674,427 | A | | 6/1987 | Finot | |
| 5,063,869 | A | * | 11/1991 | Bielefeldt | B63B 1/24 114/283 |
| 5,136,961 | A | * | 8/1992 | Follett | B63B 1/248 114/274 |
| 5,168,824 | A | * | 12/1992 | Ketterman | B63B 1/285 114/275 |
| 5,181,674 | A | * | 1/1993 | Apgar | B63H 9/0607 244/47 |
| 5,373,800 | A | * | 12/1994 | Steinberg | B63B 1/22 114/282 |
| 6,341,571 | B1 | * | 1/2002 | Russell | B63B 1/125 114/102.1 |
| 6,578,507 | B1 | * | 6/2003 | Bergmark | B63B 1/322 114/272 |
| 6,691,632 | B2 | * | 2/2004 | Stevens | B62B 15/002 114/272 |
| 6,779,473 | B1 | * | 8/2004 | Maconochie | B63B 1/322 114/102.16 |
| D720,280 | S | * | 12/2014 | Bray | D12/303 |
| D781,382 | S | * | 3/2017 | Etcheparre | D21/542 |
| 2017/0349246 | A1 | * | 12/2017 | Tian | B63B 35/7943 |

FOREIGN PATENT DOCUMENTS

| | | | |
|---|---|---|---|
| FR | 2 655 309 A1 | 6/1991 | |
| FR | 2655309 A1 * | 6/1991 | ........... B63H 9/0607 |
| GB | 2160165 A * | 12/1985 | ................ B63B 1/12 |
| WO | 02/081296 A1 | 10/2002 | |

* cited by examiner

SAILBOAT

1. FIELD OF THE INVENTION

The invention relates to a sailboat having a boat hull, two flow profiles protruding laterally from the boat hull in addition to the sails, and at least one underwater hydrofoil.

2. DESCRIPTION OF THE PRIOR ART

For maneuvering sailboats, providing two flow profiles protruding laterally from the boat hull, which have floats and downwardly extending wing shafts on the ends thereof, which each bear a buoyancy control wing, is known (EP 0358888 A1), wherein the wing shafts act as lateral control wings. However, this has the disadvantage that in the event of heavier swell or stronger heeling of such a sailboat, the floats become hydrodynamically active and therefore negatively influence the hydrodynamic properties of the sailboat and the control behavior of the lateral control wings. This has the result that at higher travel velocities, the stability and maneuverability of such a sailboat is impaired or higher travel velocities cannot be achieved at all.

In addition, cat-rigged single-handed dinghies are known, which are equipped with hydrofoils. These lift the boat hull out of the water even at low velocity due to its low weight. To compensate for the sail pressure, the sailor sits in this case on outrigger frames protruding laterally from the boat hull. However, these single-handed dinghies have the disadvantage of reduced stability and the low travel velocity because of the limited sail pressure which can be compensated for.

SUMMARY OF THE INVENTION

The invention is therefore based on the object of designing a sailboat of the type described at the outset so that high travel velocities can be achieved while maintaining the stability of the sailboat and balanced control behavior.

The invention achieves the stated object in that the flow profiles extend upward in a V shape from the boat hull and each have an aerodynamic stabilizer forming an aerodynamic aileron, and the at least one underwater hydrofoil is provided with a hydrodynamic stabilizer forming a hydrodynamic aileron.

To stabilize a sailboat and/or to increase the sail pressure and therefore the travel velocity, in the case of a sailboat according to the invention having a hull, a torque about the longitudinal axis of the boat hull, which counteracts the leeward heeling, has to be generated. This is required in particular if the aligning torque of the sailboat, lacking a keel, is comparatively low due to a particularly narrow body or, as here in the case of a boat hull which lifts out of the body at higher velocities, is not present.

To generate such a counter torque, according to the invention, an aerodynamically active stabilizer can be provided on two flow profiles, which protrude upward from the boat hull in a V shape and are arranged symmetrically in relation to the boat hull. Due to the V-shaped arrangement of the flow profiles and therefore also the stabilizer, it acts as an aileron, tail plane, and vertical stabilizer. The V-shaped and symmetrical arrangement of the flow profiles in relation to the boat hull enables in this case the aerodynamic stabilizer to also remain effective in the event of stronger heeling of the sailboat, as is a concern in the case of higher wind and sail pressure. To stabilize a sailboat according to the invention or to increase travel velocity and sail pressure, respectively, the stabilizer can form an aerodynamic aileron, wherein advantageous design properties result if this aerodynamic aileron is incorporated into the flow profile protruding laterally from the boat hull. In the neutral position of the aerodynamic aileron, the flow profiles can be aerodynamically neutral, i.e., generate neither aerodynamic lift nor downforce. This is the case, for example, if the flow profiles are designed as symmetrical, in contrast to conventional wings, so that they neither generate lift nor downforce per se. In the case of heeling of the sailboat according to the invention, a lift can be generated on one flow profile and a downforce can be generated on the other flow profile via the aerodynamic aileron, to generate a torque, which counteracts the heeling, about the longitudinal axis of the boat hull. However, the flow profiles can also be designed similarly to known wings so that they generate an aerodynamic lift independently of the position of the aerodynamic aileron.

To generate a counter torque as described above, according to the invention, an underwater hydrofoil having a hydrodynamic stabilizer designed as a hydrodynamic aileron can be provided additionally or alternatively to the aerodynamic stabilizer. Such an underwater hydrofoil can be arranged, for example, on one or more spars protruding downward from the boat hull, wherein the two rudder blades of the hydrodynamic aileron are each rotatably mounted laterally on the spar. If multiple underwater hydrofoils are provided, only a part of these underwater hydrofoils can thus also be provided with a hydrodynamic stabilizer designed as a hydrodynamic aileron, while the remaining underwater hydrofoils only form an elevator having one or more rudder blades acting in the same direction and are therefore used to regulate the buoyancy. For example, one spar can be provided amidships and one spar can be provided in the tail region in each case on the longitudinal axis of the boat hull, wherein the spar arranged amidships is associated with an underwater hydrofoil designed as an aileron and the spar arranged in the tail region is associated with an underwater hydrofoil designed as an elevator.

To enable particularly balanced control behavior, the above-described aerodynamic aileron and the hydrodynamic aileron are arranged in or essentially in a plane transverse to the longitudinal axis of the boat hull. In order, in the case of multiple spars arranged in succession on the boat longitudinal axis, to avoid mutual hydrodynamic influence of the underwater hydrofoils arranged on the two spars, for example, due to turbulence, the underwater hydrofoils can be arranged at different heights or the spars can be formed in different lengths.

The use according to the invention of two spars provided with underwater hydrofoils enables in this case the boat hull to lift as far as possible out of the water even at low travel velocities, so that even in the event of taller wave crests, as are to be expected on the open ocean, for example, breaking waves on the boat hull can be prevented. For this purpose, the spars accommodating the underwater hydrofoils can also be designed as correspondingly long.

A sailboat according to the invention can be provided with one and also with both described measures for generating a counter torque about the longitudinal axis of the boat hull, i.e., either with an aerodynamic aileron or with a hydrodynamic aileron, or both with an aerodynamic aileron and also with a hydrodynamic aileron.

If the sailboat according to the invention is heeled in the lee direction, for example, as a result of a high wind and sail pressure, with the aid of the leeward rudder blades of the aerodynamic and/or hydrodynamic aileron, an aerodynamic and/or hydrodynamic lift can be generated, and with the aid of the windward rudder blades of the aerodynamic and/or hydrodynamic aileron, an aerodynamic and/or hydrodynamic downforce can be generated, to generate a torque about the longitudinal axis of the boat hull which counteracts a leeward heeling arising due to the wind pressure. At the same time, the sail pressure is thus also increased, which has an advantageous effect on the travel of the sailboat.

Due to the reduction of the leeward heeling of the sailboat, however, the projected sail surface increases, so that the sail pressure increases continuously until reaching a point without heeling.

As a function of wind pressure, travel velocity, and position of the ailerons, at this point the torque about the longitudinal axis of the boat hull generated by the aileron can also reach a value which exceeds the torque about the longitudinal axis of the boat hull generated by the wind pressure, so that the sailboat according to the invention inclines toward the wind, i.e., achieves a windward heeling.

In the case of a windward heeling of the sailboat according to the invention, a force component generating a lift also results from the wind pressure in the sail, so that the lifting of the boat hull above the water level is promoted. This has a favorable effect in particular in the case of larger dimensioning of the sailboat according to the invention, because the underwater hydrofoil otherwise responsible for the lift can thus be relieved.

To be able to obtain an additional aerodynamic lift or downforce, the two rudder blades of the aerodynamic and/or hydrodynamic aileron can also be trimmed in the same direction accordingly.

In addition, in the case of a windward heeling of the sailboat according to the invention, the drift of a sailboat according to the invention is reduced by the control movement of the underwater hydrofoil and the lift thus resulting. As a result of the measures, a drift in the windward direction can also result under favorable conditions. If the boat hull leaves the water, the boat hull is also windward in relation to the rotation point, so that the weight force of the boat hull also causes an increase of the sail pressure.

However, since the projected sail surface decreases again with an increasing windward heeling of the sailboat according to the invention, the torque about the longitudinal axis of the boat hull resulting due to the wind pressure is reduced, so that with uniform torque generated by the aerodynamic and/or hydrodynamic aileron, the risk exists that the sailboat will become unstable. From reaching a predetermined windward heeling, the setting of the ailerons therefore has to be selected so that the torque generated by the aerodynamic and/or hydrodynamic aileron is in equilibrium with the torque arising due to the wind pressure.

As a result of these measures for regulating the heeling of the sailboat according to the invention, the boat hull can be embodied as particularly narrow in an aerodynamically advantageous manner. Such a boat hull can have, for example, a cockpit for a crew seated in succession in the longitudinal direction, for example, a helmsman and a bowman.

Hollow bodies, which are spaced apart from the boat hull, and are preferably arranged at the end of the flow profiles, can be provided on the flow profiles, which stabilize the sailboat in the event of excessively strong heeling due to the buoyancy thereof.

Advantageous conditions result in this context if a flow connection controllable via a valve exists between the two hollow bodies of the flow profiles. This enables one hollow body at a time to be at least partially filled with a liquid and this liquid to be conducted to the other hollow body via the flow connection and the control valve depending on the relative position of the hollow bodies in relation to one another.

In the event of leeward heeling of the sailboat according to the invention, as a result of the symmetrical arrangement of the flow profiles and therefore also the hollow bodies in relation to the boat hull, the leeward hollow body is lower than the windward hollow body. If, in this position, the windward hollow body is filled with liquid and the control valve arranged in the flow connection between the hollow bodies is closed, a torque about the longitudinal axis of the boat hull results from the weight force of the windward hollow body, which counteracts the torque about this axis caused by the wind pressure and therefore stabilizes the sailboat even in the event of higher wind pressure. The sail pressure also increases due to this measure, which in turn has an advantageous effect on the travel of the sailboat. In addition, in the event of even stronger heeling, the leeward, empty hollow body causes buoyancy after it is immersed in the water, which also causes a torque about the longitudinal axis of the boat hull which counteracts the heeling. Before a turning maneuver, the control valve can be opened proportionally to the turning speed, so that the liquid flows via the flow connection from the windward hollow body into the leeward hollow body, as long as the windward hollow body is higher than the leeward hollow body. The above-described additions therefore result again after the turning maneuver.

In the case of windward heeling of the sailboat according to the invention, the windward hollow body is lower than the leeward hollow body. If the windward hollow body is filled with liquid in this position, a torque about the longitudinal axis of the boat hull results from the weight force of the windward hollow body, which counteracts the torque caused by the wind pressure about this axis, and stabilizes the sailboat and/or increases the sail pressure. The control valve can remain open in this case, because the liquid remains in the lower-lying windward hollow body due to its weight force. If a windward heeling is again activated after a turn of the sailboat according to the invention having windward heeling, the control valve can remain open during the entire turning maneuver, because after the turn, the windward hollow body is again lower than the leeward hollow body and the above described conditions therefore result again after the turning maneuver.

The flow velocity of the liquid during the turn from the higher-lying to the lower-lying hollow body can be regulated via the control valve as a function of the turning velocity.

The flow connection between the hollow bodies can be embodied differently, for example, the hollow bodies can be connected via multiple pipelines, which lead through both flow profiles and can each be regulated by one valve.

To control the flow rate, these valves can be opened or closed, respectively, either simultaneously or successively in proportion to the required flow rate.

For filling a hollow body, the valve can be designed as a multiport valve, from which a flow connection leads to a filling nozzle, which is arranged below the body of the boat hull and is located under the waterline. Due to this measure, a flow connection can be established between the filling nozzle and one of the hollow bodies at a time, to fill the respective hollow body at sufficiently high travel velocity.

For this purpose, the flow connection between the filling nozzle and the valve can be designed as a pipe linked on the boat hull in the region of the valve, which is fastened to the boat hull via a cable pull on the side opposite to the linkage. Depending on the height of the boat hull above the water and the pipe length, the filling nozzle can therefore be brought below the water surface by rotating the pipe about the linkage point by actuating the cable pull, to fill the hollow bodies. The hollow bodies can have a corresponding ventilation, for example, in the form of a simple ventilation opening, for filling.

Particularly advantageous maneuvering properties result if a common aileron controller is provided for the aerodynamic ailerons arranged on the flow profiles and the hydrodynamic ailerons. This common aileron controller is used to control the heeling of the sailboat according to the invention.

The common aileron controller can provide in this case rudder movements of different strengths depending on the travel velocity in the case of the aerodynamic aileron and the hydrodynamic aileron. Because of the comparatively high flow resistance underwater, at low velocities, preferably the hydrodynamic aileron, and at higher travel velocities preferably the aerodynamic aileron is used to control the heeling of the sailboat according to the invention. For example, the rudder movement can remain the same in the case of the aerodynamic aileron, while the rudder movement decreases with increasing travel velocity in the case of the hydrodynamic aileron. The rudder movement of the aerodynamic aileron can also increase with increasing travel velocity.

Finally, both the aerodynamic aileron and also the hydrodynamic aileron can be trimmed for a lift to be specified, to control how high the boat hull moves above the water surface and/or to achieve a vertical rudder action, which is explained in greater detail hereafter.

For a sailboat according to the invention, a downwardly protruding spar, which is arranged in the tail region of the boat hull, can be mounted so it is rotatable about its longitudinal axis on the boat hull as a hydrodynamic rudder. The spar itself can be designed as flat and therefore as a rudder blade or can form a rudder blade for a rudder with an underwater hydrofoil attached to this spar.

Advantageous structural conditions result in this context if the spar is linked so it is not only rotatable, but rather also retractable on the boat hull, so that the spar length resulting underwater may be set by retracting the spar. Of course, other spars can also be embodied as retractable.

In addition, the stabilizer arranged on the V-shaped flow profiles can also form an aerodynamic rudder.

Not only is a torque about the longitudinal axis of the boat hull, but rather also a torque about the transverse axis of the boat hull as a result of the force component in the travel direction is generated by the sail pressure. To counteract this torque, the sailboat according to the invention can be trimmed to be tail-heavy, which can be achieved, for example, by arranging the cockpit in the tail region.

In addition, the hydrofoils, which are designed either as a hydrodynamic elevator or as a hydrodynamic aileron, can be trimmed to generate a lift which counteracts a torque caused by the sail pressure.

In addition to such hydrodynamic elevators, an aerodynamic elevator located in front of the transverse axis in the travel direction can also be provided, which can be designed, for example, in the form of an additional stabilizer, the rudder blades of which are arranged laterally on the boat hull.

Advantageous force conditions and structural conditions result if such an aerodynamic elevator is formed by two rudder blades, which are linked laterally in the region of the bow on the boat hull.

In addition, the stabilizer arranged on the V-shaped flow profiles can also form an aerodynamic elevator.

In this context, the maneuvering properties of a sailboat according to the invention can be improved if a common elevator controller is provided for the hydrodynamic and aerodynamic elevators. This common elevator controller is used for controlling the inclination of the sailboat according to the invention about its transverse axis. The common elevator controller can for this purpose provide rudder movements of different strengths depending on the travel velocity at the aerodynamic elevators and at the hydrodynamic elevators. Because of the comparatively high flow resistance underwater, at low velocities, the hydrodynamic elevator is preferably used, and at higher travel velocities, the aerodynamic elevator is preferably used to control the inclination of the sailboat according to the invention about its transverse axis.

The common aileron and elevator controllers, a controller for the rudder, and optionally a controller for the valve provided in the flow connection between the two hollow bodies can be assembled into a common control panel. For example, two foot pedals can be provided for the rudder and a joystick can be provided for the control of the aileron and elevator, using which the rudder blades of the ailerons are controllable in a lateral movement in the opposite direction in the meaning of an aileron and, in a movement transverse thereto, in the same direction in the meaning of an elevator jointly with a possibly provided separate aerodynamic elevator. In addition, a regulator can be provided for the common controller for the ailerons, using which the rudder deflection of the hydrodynamic ailerons can be reduced. Furthermore, a regulator can be provided, using which the ailerons can be trimmed independently of the above-described joystick, to be able to set a certain lift of the sailboat according to the invention. Such a regulator can be provided independently for the aerodynamic and the hydrodynamic ailerons.

To improve the aerodynamic properties of a sailboat according to the invention still further, an additional stabilizer can be arranged on the end of the mainmast opposite to the boat hull, which is designed so that the mainsail rests with the uppermost, extended sail part on the stabilizer, so that the mainsail terminates flush with the stabilizer at the top in the top region. This measure reduces the turbulence occurring in the top region of the mainsail and therefore the aerodynamic resistance linked thereto.

Advantageous sailing conditions result in the case of a sailboat according to the invention if the aerodynamic and/or hydrodynamic ailerons are activated so that, under a windward heeling of the sailboat, an equilibrium results between the torque generated by the aerodynamic and/or hydrodynamic ailerons and the torque resulting due to the wind pressure. As stated above, due to this measure, a force component generating lift, which reduces the mechanical load of the underwater hydrofoil, not only results from the wind pressure in the sail, but rather the sail pressure is also maximized for the above-mentioned reasons, whereby a very high travel velocity of the sailboat according to the invention is achieved.

BRIEF DESCRIPTION OF THE DRAWING

The subject matter of the invention is illustrated by way of example in the drawing. In the figures

DESCRIPTION OF THE PREFERRED EMBODIMENT

Figure 1:
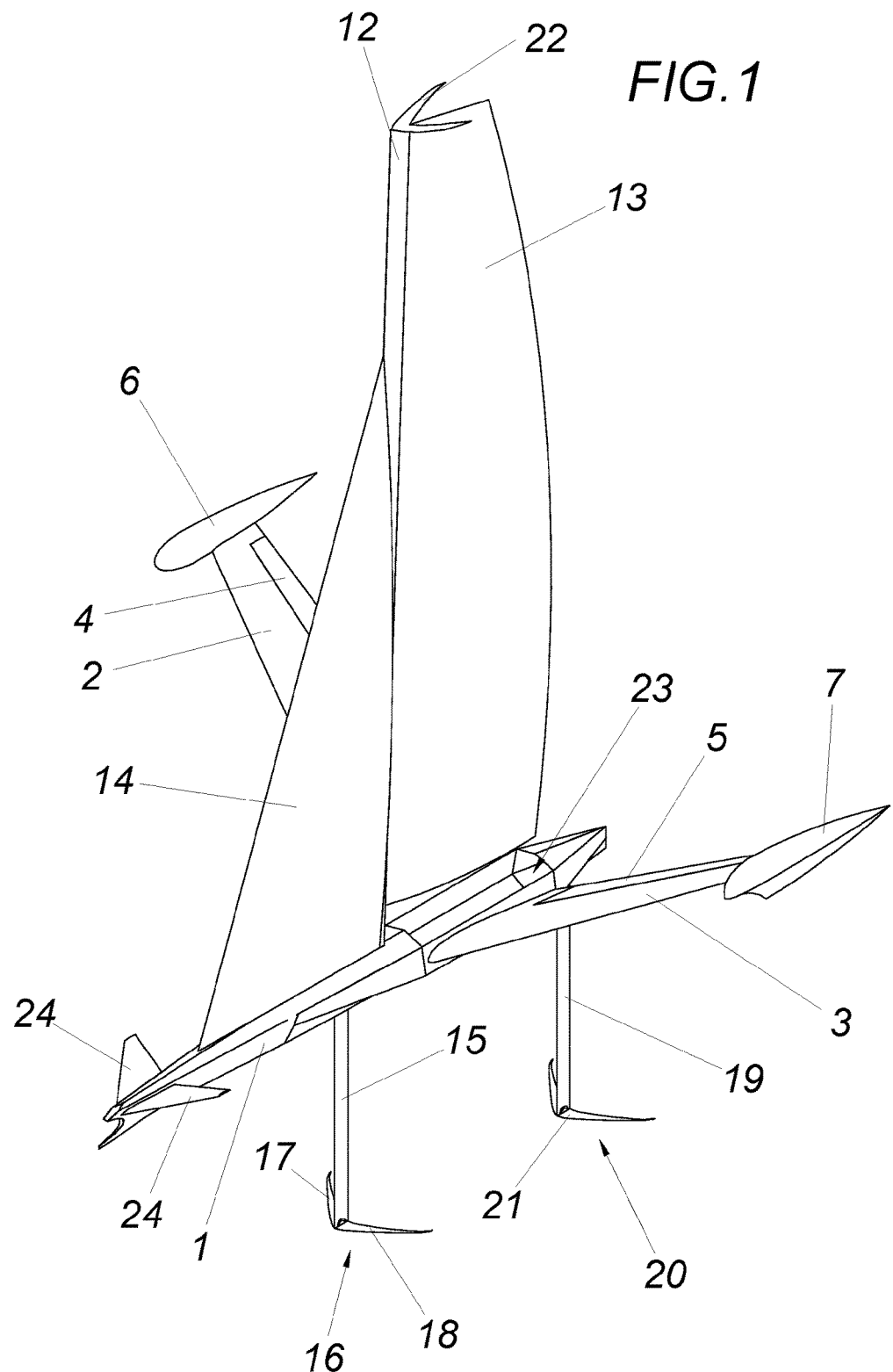
FIG. 1 shows a perspective view of a sailboat according to the invention in a simplified, schematic illustration.
Figure 2:
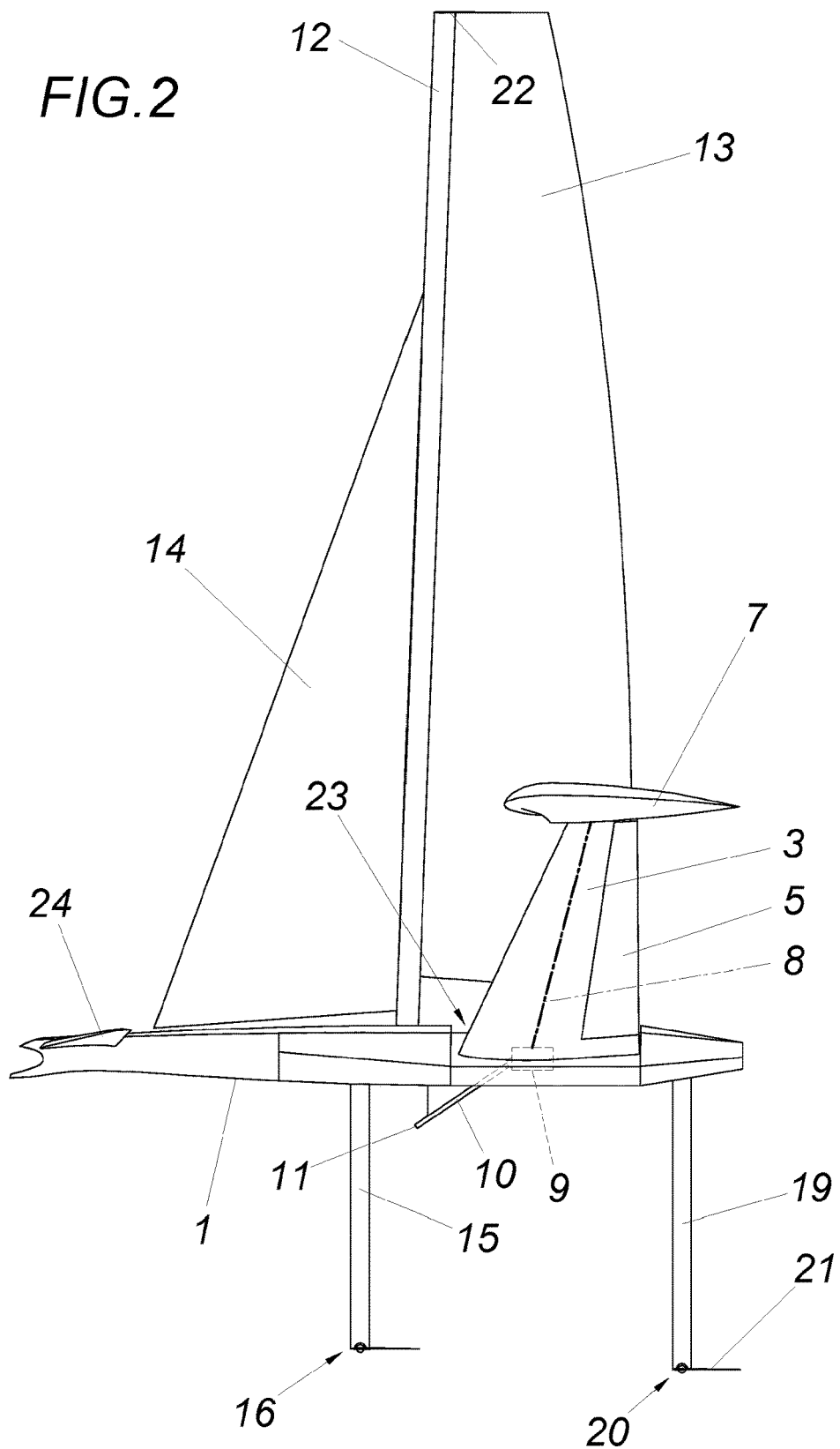
FIG. 2 shows a side view of the sailboat of FIG. 1.
Figure 3:
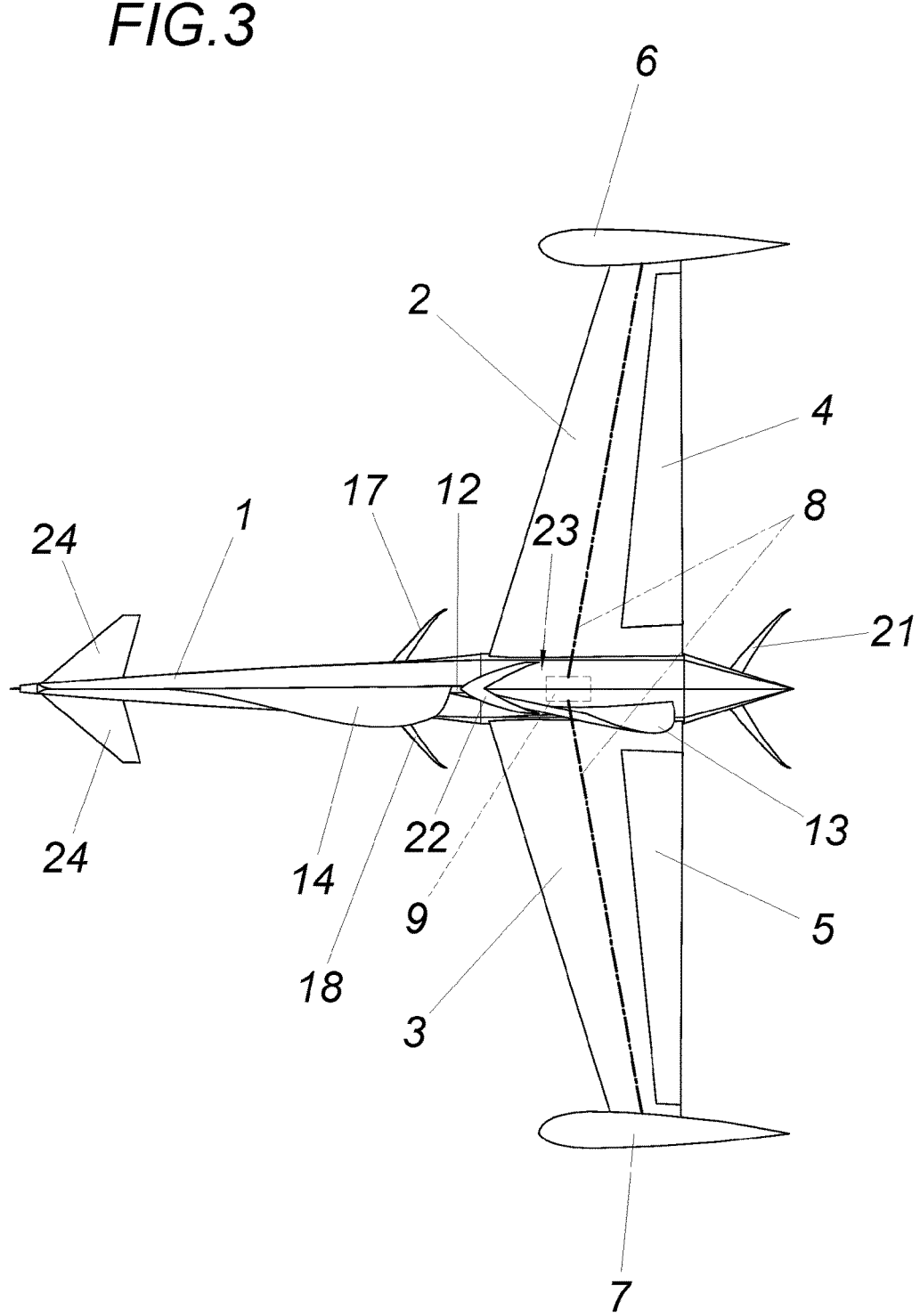
FIG. 3 shows a top view of the sailboat of FIGS. 1 and 2.

A sailboat according to the invention comprises a boat hull 1 and two flow profiles 2 and 3, which protrude laterally from the boat hull. The flow profiles 2 and 3 are arranged in a V-shape in relation to one another and symmetrically in relation to the boat hull 1. The flow profiles 2 and 3 each have an aerodynamic stabilizer designed as an aerodynamic aileron 4 and 5. A hollow body 6 and 7 is arranged on each of the ends of the flow profiles 2 and 3 facing away from the boat hull 1. As can be inferred from FIGS. 2 and 3 in particular, the hollow bodies 6 and 7 are connected via a flow connection 8, which is indicated by dot-dash lines, and a multiport valve 9 incorporated into this flow connection 8. A flow connection 10 also leads from the multiport valve 9 to a filling nozzle 11 located under the waterline of the boat hull 1. The multiport valve 9 is used in this case to produce a flow connection between the hollow bodies 6 and 7 via the flow connection 8 on one side and between the filling nozzle 11 and one of these two hollow bodies 6 or 7 via the flow connections 10 and 8.

A mast 12 having a mainsail 13 and a headsail 14 protrudes amidships from the boat hull 1. A downwardly protruding spar 15, which has an underwater hydrofoil 16 on its end opposite to the boat hull 1, which consists of two rudder plates 17 and 18, which are rotatably mounted on the spar 15 and therefore form a hydrodynamic aileron, is arranged in the region of the mast 12 on the lower side of the boat hull 1.

A second downwardly protruding spar 19 is arranged in the tail region of the boat hull 1, which also has an underwater hydrofoil 20 on its end facing away from the boat hull 1, which is not designed as a hydrodynamic aileron like the underwater hydrofoil 16, but rather solely as a hydrodynamic elevator. The underwater hydrofoil 20 therefore has only a single rudder blade 21. The spar 19 is linked so it is rotatable about its longitudinal axis on the boat hull 1 to form a rudder. Both the spar 15 and also the spar 19 are designed as retractable into the boat hull 1 in this case.

To avoid a disturbance of the hydrodynamic elevator 20 because of the water turbulence generated by the hydrodynamic aileron 16, the spar 19 is designed as longer than the spar 15, so that the two hydrodynamic ailerons 16 and 20 are located at different height levels but both on the plane of the longitudinal axis of the boat hull 1.

To improve the aerodynamic properties of the sailboat according to the invention, a stabilizer 22 is provided on the end of the mast 12 opposite to the boat hull 1, which is designed so that the mainsail 13 rests with the uppermost, extended sail part on the stabilizer 22, so that the mainsail 13 terminates flush in the top region on top with the stabilizer 22.

To accommodate the crew, in a sailboat according to the invention, a cockpit 23 arranged behind the mast 12 is provided in the boat hull 1, which is provided with two seats (not shown in greater detail in the drawing) for a helmsman and a bowman.

Two rudder blades can be linked to the boat hull 1 laterally in the region of the bow as an additional aerodynamic elevator 24.

The invention claimed is:

1. A sailboat comprising:
    a boat hull;
    two flow profiles protruding laterally upward and outward in a V shape from the boat hull; and
    a sail extending upwardly from the boat hull and in a lateral location between the flow profiles, and
    an underwater hydrofoil connected with the boat hull,
    wherein each of the flow profiles has a respective aerodynamic stabilizer forming an aerodynamic aileron configured to derive lift or downward force from air flowing thereacross, and
    wherein the underwater hydrofoil has a hydrodynamic stabilizer forming a hydrodynamic underwater aileron.

2. The sailboat according to claim 1, wherein the flow profiles each has a hollow body spaced apart from the boat hull.

3. A sailboat comprising:
    a boat hull;
    two flow profiles protruding laterally outward in a V shape from the boat hull; and
    an underwater hydrofoil connected with the boat hull,
    wherein each of the flow profiles has a respective aerodynamic stabilizer forming an aerodynamic aileron configured to derive lift or downward force from air flowing thereacross, and
    wherein the underwater hydrofoil has a hydrodynamic stabilizer forming a hydrodynamic underwater aileron; and
    wherein a flow connection controllable via a valve is supported between the two hollow bodies of the flow profiles.

4. The sailboat according to claim 3, wherein the valve is configured as a multiport valve, from which a flow connection leads to a filling nozzle, said filling nozzle being positioned under the body of the boat hull and located under a water line thereof.

5. A sailboat comprising:
    a boat hull;
    two flow profiles protruding laterally outward in a V shape from the boat hull; and
    an underwater hydrofoil connected with the boat hull,
    wherein each of the flow profiles has a respective aerodynamic stabilizer forming an aerodynamic aileron configured to derive lift or downward force from air flowing thereacross, and
    wherein the underwater hydrofoil has a hydrodynamic stabilizer forming a hydrodynamic underwater aileron; and
    wherein a common controller is associated with the aerodynamic ailerons of the flow profiles and the hydrodynamic underwater aileron.

6. The sailboat according to claim 1, wherein the sailboat further comprises an aerodynamic elevator formed by two rudder blades linked laterally to the boat hull in a region of a bow of the sailboat.

7. The sailboat according to claim 1, wherein the sail is supported on a mainmast and an additional stabilizer is supported on an end of the mainmast opposite to the boat hull so that said sail rests with an uppermost, extended sail part on the stabilizer.

8. A method for sailing comprising
    providing a sailboat according to claim 1; and
    causing, under a windward heeling of the sailboat, an equilibrium between a torque generated by the aerodynamic ailerons or the hydrodynamic underwater aileron and a torque arising due to wind pressure.

9. The method according to claim 8, wherein the flow profiles each has a hollow body spaced apart from the boat hull.

10. A method for sailing comprising
    providing a sailboat comprising:
    a boat hull;
    two flow profiles protruding laterally outward in a V shape from the boat hull; and an underwater hydrofoil connected with the boat hull;
wherein each of the flow profiles has a respective aerodynamic stabilizer forming an aerodynamic aileron configured to derive lift or downward force from air flowing thereacross; and
wherein the underwater hydrofoil has a hydrodynamic stabilizer forming a hydrodynamic underwater aileron; and
causing, under a windward heeling of the sailboat, an equilibrium between a torque generated by the aerodynamic ailerons or the hydrodynamic underwater aileron and a torque arising due to wind pressure;
wherein a flow connection controllable via a valve is supported between the two hollow bodies of the flow profiles.

11. The method according to claim 10, wherein the valve is configured as a multiport valve, from which a flow connection leads to a filling nozzle, said filling nozzle being positioned under the body of the boat hull and located under a water line thereof.

12. A method for sailing comprising
providing a sailboat comprising:
a boat hull;
two flow profiles protruding laterally outward in a V shape from the boat hull; and
an underwater hydrofoil connected with the boat hull,
wherein each of the flow profiles has a respective aerodynamic stabilizer forming an aerodynamic aileron configured to derive lift or downward force from air flowing thereacross; and
wherein the underwater hydrofoil has a hydrodynamic stabilizer forming a hydrodynamic underwater aileron; and
causing, under a windward heeling of the sailboat, an equilibrium between a torque generated by the aerodynamic ailerons or the hydrodynamic underwater aileron and a torque arising due to wind pressure; and
wherein a common controller is associated with the aerodynamic ailerons of the flow profiles and the hydrodynamic underwater aileron.

13. The method according to claim 8, wherein the sailboat further comprises an aerodynamic elevator formed by two rudder blades linked laterally to the boat hull in a region of a bow of the sailboat.

14. The method according to claim 8, wherein the sail is supported on a mainmast and an additional stabilizer is supported on an end of a the mainmast opposite to the boat hull so that said sail mainsail rests with an uppermost, extended sail part on the stabilizer.

15. The sailboat according to claim 1, wherein the two flow profiles extend laterally outward and upward from the boat hull so that the V-shape is upwardly disposed.

16. The method according to claim 8, wherein in the sailboat the two flow profiles extend laterally outward and upward from the boat hull so that the V-shape is upwardly disposed.

* * * * *